United States Patent [19]

Stephenson et al.

[11] 4,168,850
[45] Sep. 25, 1979

[54] PASSIVE SEAT BELT SYSTEM

[75] Inventors: Robert L. Stephenson, Sterling Heights; William R. Fox, Warren, both of Mich.

[73] Assignee: Allied Chemical Corporation, Morris Township, Morris County, N.J.

[21] Appl. No.: 818,800

[22] Filed: Jul. 25, 1977

[51] Int. Cl.² .................................................. B60R 21/02
[52] U.S. Cl. ........................................ 280/803; 297/475
[58] Field of Search ................. 280/745, 744; 297/388

[56] References Cited

U.S. PATENT DOCUMENTS

| | | | |
|---|---|---|---|
| 3,583,726 | 6/1971 | Lindblad | 280/745 |
| 3,700,078 | 10/1972 | Keppel | 180/111 |
| 3,700,258 | 10/1972 | Wize | 280/745 |
| 3,743,319 | 7/1973 | Winchell | 280/745 |
| 3,754,776 | 8/1973 | Cataldo et al. | 280/745 |
| 3,770,294 | 11/1973 | Hammer | 280/745 |
| 3,819,196 | 6/1974 | Bouthors et al. | 280/745 |
| 3,827,713 | 8/1974 | Sakurai et al. | 280/745 |
| 3,856,327 | 12/1974 | Otari | 280/745 |
| 3,977,701 | 8/1976 | Weman | 280/745 |

Primary Examiner—Joseph F. Peters, Jr.
Assistant Examiner—Norman L. Stack, Jr.
Attorney, Agent, or Firm—Roger H. Criss

[57] ABSTRACT

A passive seat belt system for a vehicle comprising a seat belt retractor mounted in the vehicle, seat belt webbing have one end attached to the retractor and another end attached to the vehicle, a thin elongated flexible element attached at one end to the vehicle and at a second end to a ring attached the webbing, and a button on the webbing for moving the ring and the webbing in response to motion of the vehicle door.

16 Claims, 6 Drawing Figures

PASSIVE SEAT BELT SYSTEM

BACKGROUND OF THE INVENTION

1. Field of the Invention

This invention relates to improved passive seat belt systems and more particularly to vehicle passive seat belt systems.

2. Description of the Prior Art

Passive seat belt systems, especially for the vehicle (e.g. automobile) occupants, have been previously suggested. Such systems are designed to automatically move into position about an occupant such as upon closing of the vehicle door. Passive seat belt systems of the prior art includes systems wherein a single belt is positioned around the torso or over the shoulder of the occupant as well as systems wherein a combination of lap and shoulder belts are utilized. Exemplary of such systems are those described, for example, in the following U.S. Pat. Nos. 3,754,776; 3,765,701; 3,770,294; 3,889,971; 3,895,822; 3,895,824 and 3,897,963.

One design requirement for passive seat belt systems is that they automatically move out of the way when the door is opened so as to facilitate ingress and egress of the occupant. To accomplish this feature, the systems heretofore proposed include very elaborate means for moving the belt(s) to a non-interfering position for access to the vehicle interior. Some proposed systems include motorized retracting devices and bulky actuating levers. It would be desirable is a passive seat belt system were provided which was simple is design, had minimum interference with access to the vehicle interior, was low in cost and light weight.

SUMMARY OF THE INVENTION

In accordance with this invention, there is provided a passive seat belt system for a vehicle comprising:

(a) a seat belt retractor mounted in the vehicle;

(b) seat belt webbing having a first end attached to the retractor and a second end attached to the vehicle;

(c) first mounting means affixed to the vehicle;

(d) second mounting means associated with the webbing at a location between the first and second end of the webbing; and (e) means for positioning the webbing, the means being in the form of a thin elongated flexible element and having one end attached to the first mounting means and the second end attached to the second mounting means, whereby when a door of the vehicle is opened, the second mounting means moves in relation to the vehicle and positions the webbing at a location permitting an occupant to enter the vehicle and be seated in a seat therein, and when the door is closed, the second mounting means moves in relation to the vehicle and positions the webbing at a location securing the occupant in his seat.

Preferably, the first mounting means is attached to the vehicle door and upon opening of the door, the positioning means is moved so as to position the webbing out of the way to permit the occupant to enter the interior of the vehicle. The positioning means may be in the form of a cord or cable which takes up very little room and yet is strong enough to move the webbing in and out of position.

The passive seat belt systems of this invention require minimum components other than a seat belt webbing which is used at the passive restraint and adds little weight or complexity to the webbing itself. Electrically operated devices are not required and neither are large mechanical means required to effect proper movements of the webbing about the occupant.

DESCRIPTION OF THE PREFERRED EMBODIMENTS

Figure 1:
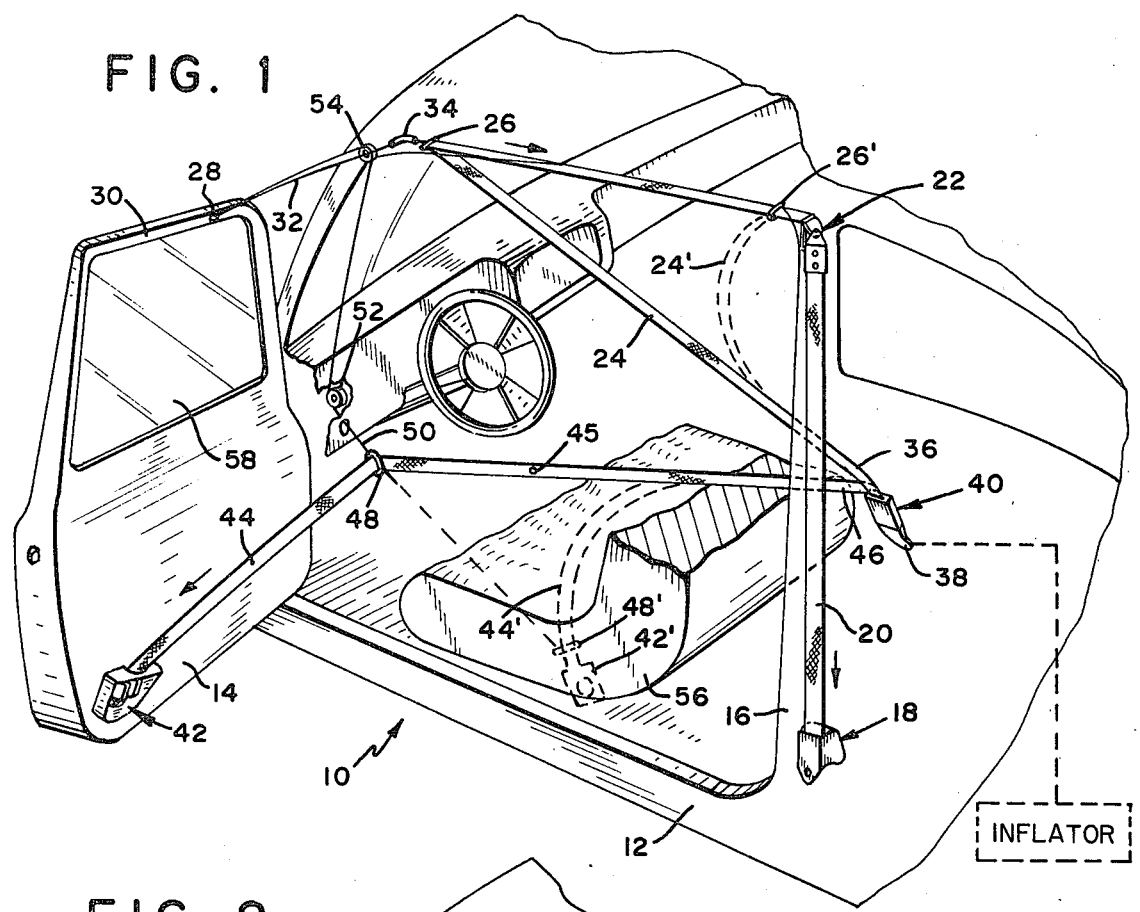
FIG. 1 is a perspective view of one embodiment of the passive seat belt system of this invention.

With respect to FIG. 1, there is shown one embodiment of the passive seat belt system of this invention. The passive seat belt system 10 is shown mounted in vehicle 12 which has a door 14 (typically a front door). Mounted on the vehicle structure, such as on a "B" pillar 16, is a seat belt retractor 18 of conventional design which preferably is of the emergency locking type which locks the retractor against motion in an extending direction as a result of an emergency situation. For example, retractor 18 may be of the web-sensitive or vehicle-sensitive type which locks upon an acceleration of the webbing or deceleration of the vehicle, respectively, above a predetermined level. Seat belt webbing 20 which forms the shoulder harness 24 has one end which is wound up on retractor 18, which includes a main rewind spring that urges the webbing in a rewind direction. Webbing 20 passes through the conventional guide device 22, which may be a "D" ring or the like, that is may be mounted on pillar 16. D ring 22 may be provided with a locking feature to lock against the webbing; such web locking claims are disclosed, for example, in U.S. Pat. No. 3,847,434 to Weman and U.S. application Ser. No. 746,030, filed Nov. 30, 1976 to Pfeiffer et al. A mounting means 26 which may be in the form of a clamp or the like is associated with shoulder harness 20 at a location between retractor 18 and end 36 of the webbing which is attached to the vehicle structure. Mounting means 26 may be in the form of a metal clamp surrounding the webbing, or may be a section of fabric sewn to the webbing or may be any other suitable device adaptable to receive positioning means 32. For example, mounting means 26 may be in the form of a metal or plastic ring which permits the webbing 20 to move freely therethrough and webbing 20 may be provided with a stop means in the form of a button or other raised projection which engages the ring and moves the same to the desired position. A second mounting means 28 is affixed to a portion of the vehicle structure, such as on window frame 30 associated with window 58. Mounting means 28 may be in the form of rivet, eyelet or other fastener or the like. Positioning means 32 is in the form of a thin elongated flexible element. Such elements may comprise a cord, cable, rope, wire, filament, thread, fiber, yarn, monofilament, line, string, fabric, or the like which has a relatively small cross-sectional area but a high tenacity. For example, element 32 may be in the form of nylon or polyester cord. In the following discussion, element 32 is simply referred to as a cord, or cord-like structure, although it is to be understood that other flexible elements are also intended.

One end of cord 32 is affixed to mounting means 26 by any suitable means, such as by tying, adhering or otherwise securing cord 32 to mounting means 26. The other end of cord 32 is affixed to mounting means 28 also by suitable means. A guide 34 in the form of a tube or one or more rollers or the like may be provided in the vehicle structure between mounting 26 and 28 to guide cord 32, with the cord passing through the interior of the guide, for example. As an example, guide 34 may be provided in the roof or windshield frame of the vehicle. A portion 24 of shoulder harness 20 is adapted to be secured diagonally around the torso of an occupant when seated in seat 56, which may, for example, be a bucket seat. End 36 of shoulder harness 20 is attached by any suitable device to the vehicle structure at 38. For example, end 36 may be mounted through a metal cable, strap, D ring, etc. There optionally may be incorporated an emergency release mechanism 40 to which end 36 of the webbing may be affixed and which is secured to the vehicle at 36. For example, emergency release mechanism 40 may be in the form of a conventional seat belt buckle and tongue assembly and is operable in emergency situations to release the passive belt system from the occupant for emergency egress of the vehicle.

Passive seat belt system 10 is shown in FIG. 1 as including a lap belt 44. Lap belt 44 may be in the form of a conventional seat belt webbing, one end of which is wound up on a second retractor 42 which may be mounted in door 14. Retractor 42 may likewise be an emergency (inertial) locking retractor as may be retractor 18 and likewise includes a rewind spring which biases the webbing toward the retractor. The other end 46 of lap belt 44 is also connected to a vehicle structure. For example, as shown, end 46 may be attached to end 36 of the shoulder belt and both in turn attached to the vehicle at 36 through, for example, emergency release buckle 40. Of course, ends 36 and 46 need not be commonly affixed to the vehicle structure. Between retractor 42 and end 46, there is provided another mounting means 48 which may be similar to mounting means 26 associated with the shoulder harness. Preferably, mounting means 48 is in the form of a metal or other ring or the like which permits webbing 44 to pass therethrough. Webbing 44 is provided with a button 45 or the like which is adapted to engage mounting means 48 and move it along belt 44. Alternatively, mounting means 48 may be in the form of a clamp which is affixed to belt 44. Attached to mounting means 48 is a second cord 50 or the like which also has its opposite end mounted to a portion of the vehicle structure. For example as shown, the opposite end of cord 50 may be attached commonly with the end of cord 32 to mounting means 28; of course, a second mounting means may alternatively be provided but common mounting means are preferred in order to avoid a complex system. Cord 50 may be guided to mounting means 28 through one or more suitable guide means, such as a guide roller 52 shown as being mounted in the dashboard (or on the A pillar) and a second roller 54 shown as being mounted adjacent the windshield frame. Roller 54 may be mounted to the vehicle adjacent to guide 34 for cord 32 if desired. The guide means are selected so as not to interfere with movement of the respective cord.

In operation, when door 14 is open, the passive seat belt system takes the position as shown in solid lines in FIG. 1. In this position, the occupant is permitted free ingress and egress into and from seat 56. Upon closing upon door 14, the distance between mounting means 28 and guide 34 and between mounting means 28 and guide 52, for example, is decreased and hence there is some slack in cords 32 and 50. Due to the biasing force of the rewind spring associated with retractors 18 and 42, additional seat belt webbing associated with the shoulder harness is free to be wound up on retractor 18 and additional seat belt webbing associated with lap belt 44 is free to be wound up on retractor 42. The rewind motion of the webbing is depicted by the arrows in FIG. 1. As a result, mounting means 26 is moved rearward along the top of the vehicle adjacent the car door until such point that no additional slack is present in cord 32 between mounting means 26 and 28. At such point, mounting means 26 had moved to position 26' shown in FIG. 1. This in turn causes shoulder harness 24 to move into position 24' shown in the dotted lines wherein the shoulder harness is in its normal occupant restraint position. Similarly, when door 14 is closed, additional webbing 44 is wound up on retractor 42 until such point that button 45 contacts mounting means 48 and moves mounting means 48 likewise in a direction of the arrow towards retractor 42. Additional webbing 44 is moved along with mounting means 48 towards retractor 42 until lap belt 44 is in position about the occupant and there is no additional slack between mounting means 48 and 28, for example. The position of lap belt 44, mounting means 48 and retractor 42 is shown by the dotted lines and are indicated by the prime numerals.

The passive restraint systems of the present invention may include portions of the webbing which have inflatable sections and may be inflated by an inflator as schematically shown in FIG. 1. The use of inflatable sections of the seat belt webbing or the like is shown, for example, in various U.S. patents, such as U.S. Pat. No. 3,841,654 to Lewis et al.

Figure 2:
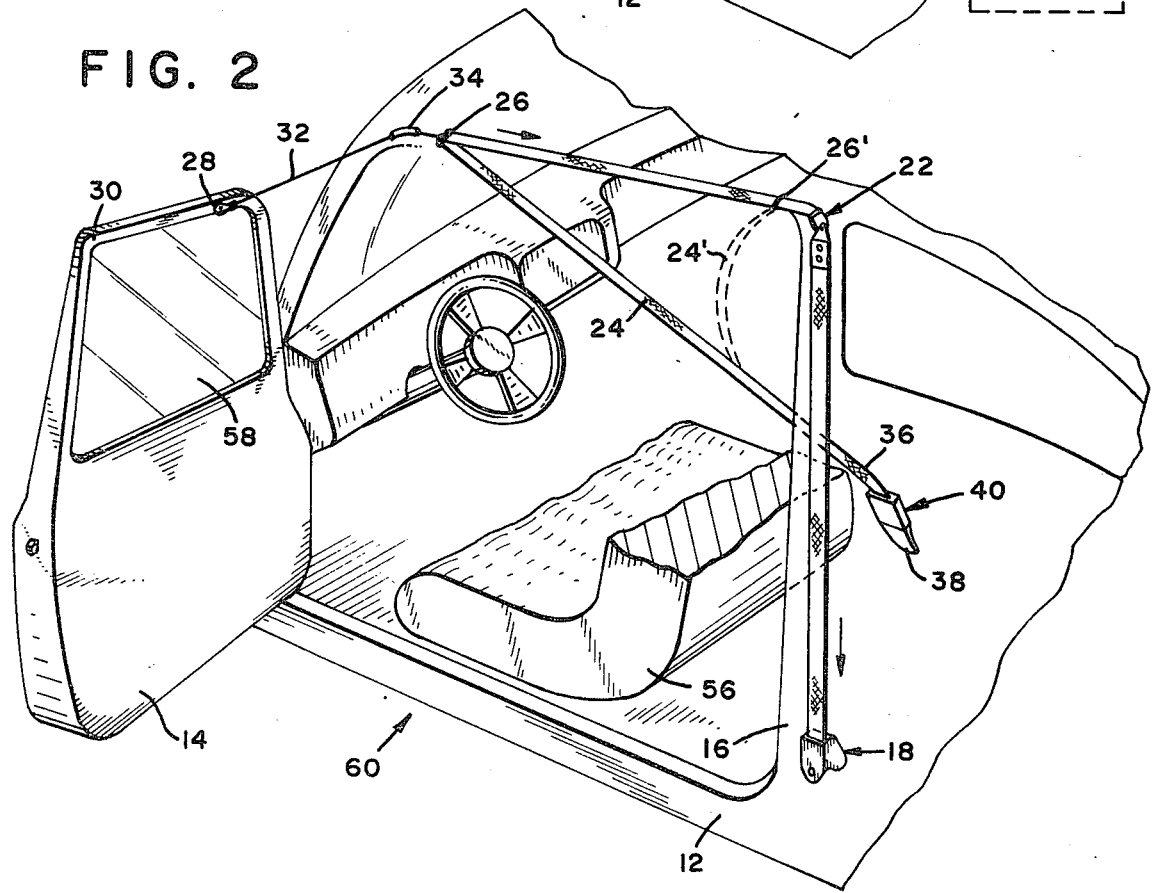
FIG. 2 is a perspective view of another embodiment of the passive seat belt system of this invention.

With respect to FIG. 2, a passive seat belt system similar to that shown in FIG. 1 is depicted, except that a single torso or shoulder harness belt 24 is shown without any lap belt. The arrangement is the same as shown in FIG. 1 with the mounting means 26 moving in the direction of the arrow to position 26' and shoulder harness 24 moving to the position shown at 24' when door 14 is closed so as to position the shoulder harness 24 around the occupant. The passive seat belt system of FIG. 2 is shown in general at 60.

Figure 3:
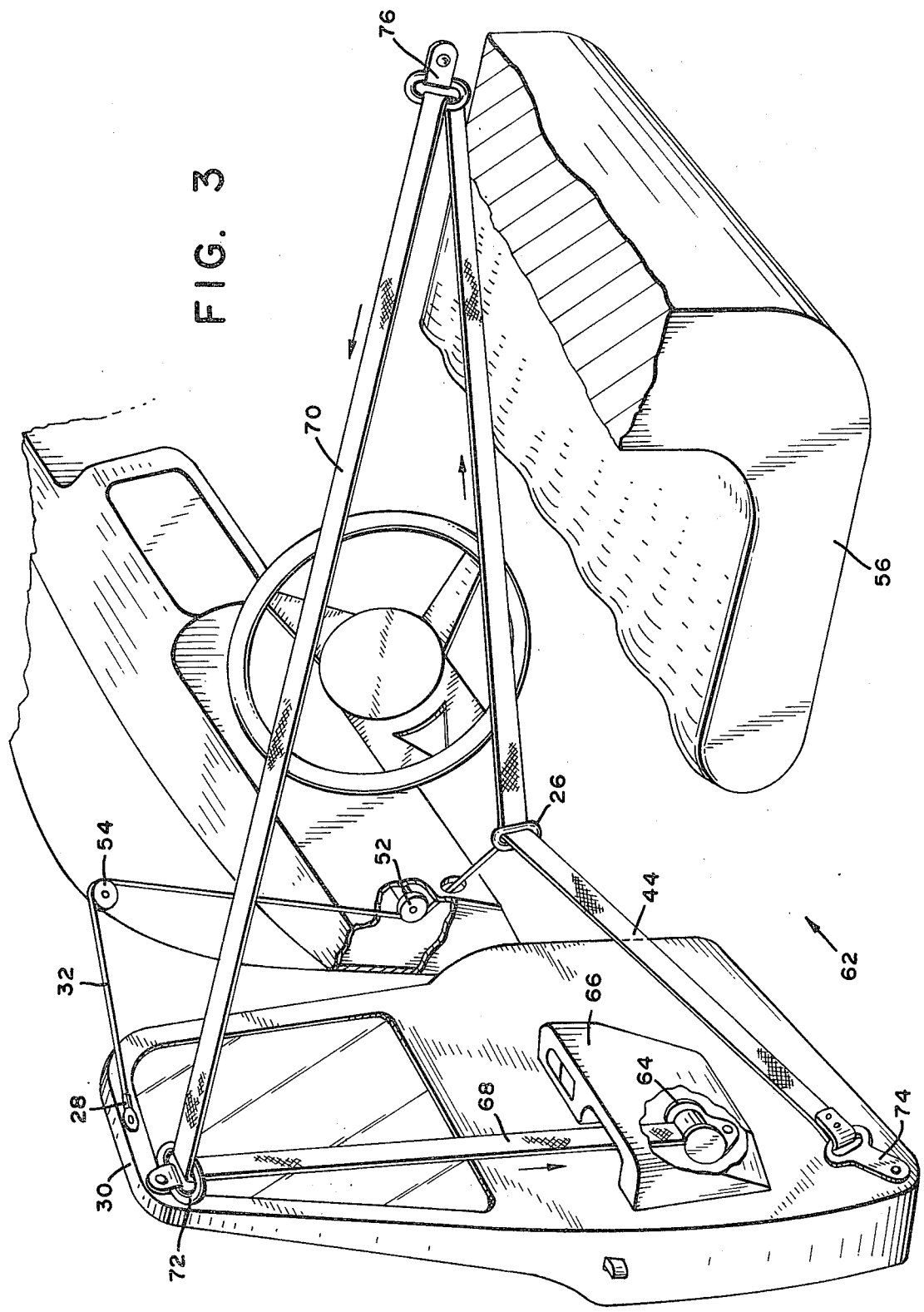
FIG. 3 is a perspective view of a third embodiment of the passive seat belt system of this invention.

With respect to FIG. 3, a third embodiment of the passive seat belt system of this invention is shown wherein a single continuous webbing is utilized to provide both shoulder and lap restraints. Passive seat belt system 62 is shown in vehicle 12. Mounted on door 14 is a conventional retractor 64 which also may be of the emergency locking type as previously disclosed. Retractor 64 may be mounted in the interior of door 14 at the arm rest 66 or similar position. Seat belt webbing 68 which forms the shoulder harness 70 of the passive restraint system has one end wound up on retractor 64 and passes through a guide means 72 which is shown as being mounted in window frame 30 of door 14. Guide 72 may be in the form of an open or locking D ring or similar structure. Shoulder harness 68 passes through ring 72 and then across seat 56 of the vehicle towards another D ring or similar device 76 which is suitably mounted to the vehicle structure. Webbing 68 passes through ring 76 and moves across seat 56 towards mounting means 26 which is similar to that shown in FIG. 1. The belt passes through mounting means 26 towards another end thereof which is mounted on door 14 at 74, which may be in the form of another D ring or the like. The portion of the belt which extends from D ring 76 to D ring 74 forms lap belt 44 of the restraint system. Associated with mounting means 26 is a cord 32 which is connected therewith and which passes over guide rollers 52 and 54 as in the FIG. 1 embodiment, with its other end attached at mounting means 28 to door frame 30. Mounting means 26 is similar to that of the FIG. 1 embodiment.

FIG. 3 depicts the passive seat belt system 62 in position with the door 14 being ajar. When the door is closed, slack in seat belt webbing 68 is taken up by the retractor spring in retractor 64 and moves the webbing in a direction shown by the arrows in FIG. 3 to take up slack in the webbing. When the door is closed, belt 70 and belt 44 form the shoulder and lap portions of the passive restraint system of this invention.

Figure 4:
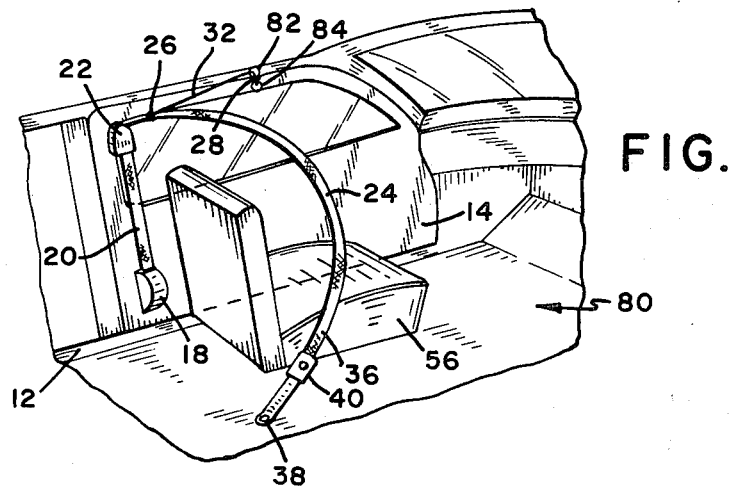
FIG. 4 is a perspective view of a fourth embodiment of the passive seat belt system of this invention as viewed towards the outside of the vehicle.
Figure 5:
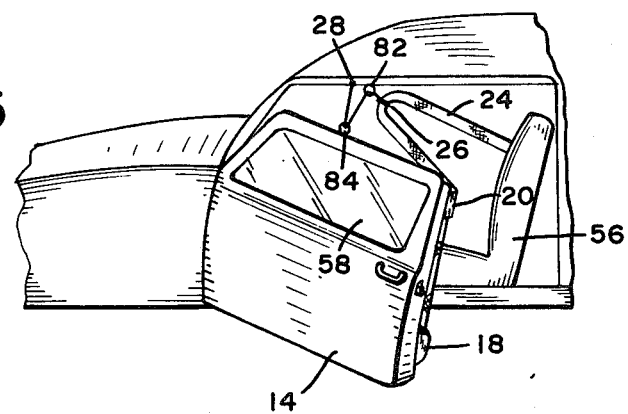
FIG. 5 is a side perspective view of FIG. 4 as viewed towards the inside of the vehicle with the door opened.
Figure 6:
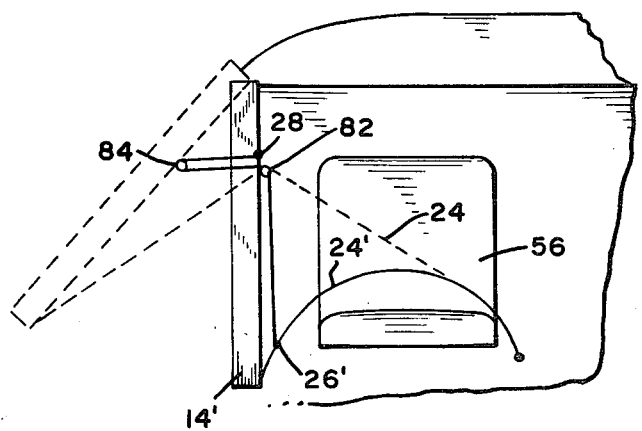
FIG. 6 is a plan view of the passive seat belt system of FIG. 4.

With respect to the FIG. 4 embodiment, another embodiment of the passive restraint system of this invention is shown. Such embodiment is similar to that shown in FIG. 2 in that a single belt 24 is utilized to provide occupant restraint. The distinction between the FIGS. 4–6 embodiment and that of FIG. 2 is that the guide means are shown in the form of rings 82 and 84 or the like. Ring 82 is mounted to the vehicle roof structure and ring 84 is shown as mounted to the window frame of door 14. Shoulder harness 24 has cord 32 mounted to it via mounting means 26 as shown in the FIG. 2 embodiment. Cord 32 passes from mounting means 26 through ring 82 and through ring 84 until it reaches second mounting means 28 which may be associated with the roof of the vehicle interior. As shown in FIG. 6, when door 14 is opened (that open position being shown in dotted lines in FIG. 6 and the closed position being shown by the solid lines in FIG. 6), cord 32 passes back and forth through rings 82 and 84 to mounting means 28. It should be appreciated that any suitable number of rings 82 and 84 or the like may be provided to provide the necessary degree of storage of cord 32. As shown in FIGS. 5 and 6, when door 14 is opened, shoulder harness 24 is moved to a non-interfering position due to the motion of cord 32 which is pulling on mounting means 26 and lifting it forward and upwards as door 14 is opened. When the occupant is seated in his seat, and door 14 is closed, the retractive force of the rewind spring associated with retractor 18 rewinds excess slack of webbing 24 onto the retractor and positions the shoulder harness in the proper position around the occupant. Also, additional slack in the system is taken up by the respective motion of cord 32.

In order to coordinate movement of the door with the requisite amount of travel of the webbing for proper positioning of the webbing for ingress and egress, a multiplying device may be provided to provide the necessary conversion of such movement. For example, the cord may be passed a multiple of times back and forth between the vehicle structure and the door structure using rollers, for example, to obtain the proper multiplying effect.

It is to be understood that the mounting means may be provided in any suitable and convenient location in the vehicle. For example, the mounting means 28 may be mounted anywhere on door 14. Similarly, the seat belt retractor(s), D ring(s) and second mounting means may likewise be mounted at various locations in the vehicle. For example, in the FIG. 1 embodiment, both retractors and/or the D ring (which may be provided with locking means) may be mounted on the door and in the FIG. 3 embodiment, retractor 64 and/or D ring 72 may be mounted on a vehicle pillar.

It can be seen that the passive seat belt system of this invention is simple in construction and operation, does not add excessive weight to the vehicle and does not interfere with ingress and egress to the vehicle interior.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. A passive seat belt system for a vehicle comprising:
   (a) seat belt retractor means mounted in the vehicle;
   (b) seat belt webbing having a first end attached to said retractor and a second end attached to said vehicle;
   (c) first mounting means affixed to the vehicle;
   (d) second mounting means associated with said webbing at a location between said first and second ends of said webbing;
   (e) contact means on said webbing for moving said second mounting means; and
   (f) means for positioning said webbing, said means being in the form of a thin elongated flexible element and having one end attached to said first mounting means and the second end attached to said second mounting means,
   whereby when a door of the vehicle is opened, said second mounting means moves in relation to said vehicle and positions said webbing at a location permitting an occupant to enter said vehicle and be seated in a seat therein, and when said door is closed, said second mounting means moves in relation to said vehicle and positions said webbing at a location securing said occupant in his seat.

2. The passive seat belt system of claim 1 wherein said positioning means comprises a cord-like structure.

3. The passive seat belt system of claim 2 wherein said first mounting means is mounted on a door of said vehicle.

4. The passive seat belt system of claim 3 wherein said first mounting means is mounted to a frame of a window in said door.

5. The passive seat belt system of claim 2 wherein said second mounting means is affixed to said belt.

6. The passive seat belt system of claim 1 wherein said contact means comprises a button on said webbing.

7. The passive seat belt system of claim 6 wherein said second mounting means comprises a ring through which said webbing passes and said button moves said ring when said webbing is retracted by said retractor.

8. The passive seat belt system of claim 2 wherein guide means is provided between said first and second mounting means for guiding said cord-like structure.

9. The passive seat belt system of claim 2 wherein said webbing comprises a shoulder harness.

10. The passive seat belt system of claim 2 wherein said webbing comprises a shoulder harness and lap belt.

11. The passive seat belt system of claim 10 wherein said second mounting means is associated with said shoulder harness and a third mounting means is associated with said lap belt, said third mounting means being connected to said first mounting means by a cord-like structure.

12. The passive seat belt system of claim 10 wherein said webbing is a single continuous webbing and a single retractor is provided to provide for retraction and extension of said webbing.

13. The passive seat belt system of claim 10 wherein separate retractors are provided for said shoulder harness and said lap belt.

14. The passive seat belt system of claim 2 wherein said webbing is inflatable.

15. The passive seat belt webbing of claim 2 wherein means separate from said retractor means are provided for locking said webbing from extension in emergency situations.

16. The passive seat belt system of claim 2 wherein an emergency release mechanism is associated with said webbing to provide for emergency egress from said vehicle.

* * * * *

UNITED STATES PATENT AND TRADEMARK OFFICE
CERTIFICATE OF CORRECTION

PATENT NO. : 4,168,850
DATED : September 25, 1979
INVENTOR(S) : R. L. Stephenson and W. R. Fox It is certified that error appears in the above-identified patent and that said Letters Patent are hereby corrected as shown below:

Column 1, line 68, "at" should read -- as --.

Column 2, line 40, "the" should read -- a --.

Column 5, line 37, "that" should read -- the --.

Column 6, line 22, following "retractor" insert -- means --.

Signed and Sealed this

Eighteenth Day of December 1979

[SEAL]

Attest:

SIDNEY A. DIAMOND

Attesting Officer

Commissioner of Patents and Trademarks